United States Patent [19]

Trudgeon

[11] Patent Number: 5,101,932
[45] Date of Patent: Apr. 7, 1992

[54] DROP OVER HANGER FOR PLACEMENT OVER AN UPRIGHT PIECE OF 2" BY 4" LUMBER TO SUPPORT ANOTHER LIKE HANGER OR ANOTHER TYPE OF SUPPORT, BY UTILIZING INTERFITTING SETS OF FOUR ORIGINALLY UPSTANDING SPACED TOP ENTRY PROJECTING SLOTTED TABS

[76] Inventor: Leo D. Trudgeon, 604 Maple, Snohomish, Wash. 98290

[21] Appl. No.: 709,704

[22] Filed: Jun. 3, 1991

[51] Int. Cl.⁵ .......................... B27B 21/00; B25B 1/20
[52] U.S. Cl. ...................... 182/129; 182/181; 182/224; 403/232.1; 269/902; 256/23
[58] Field of Search ............... 182/129, 181, 182, 183, 182/184, 185, 224; 256/23; 403/232.1; 248/248; 269/902, 296

[56] References Cited

U.S. PATENT DOCUMENTS

| | | | |
|---|---|---|---|
| 3,339,920 | 9/1967 | Moritz | 182/181 |
| 3,843,110 | 10/1974 | Smith | 269/902 |
| 4,181,292 | 1/1980 | Hubel | 182/181 |
| 4,260,040 | 4/1981 | Kieffer | 182/181 |
| 4,298,095 | 11/1981 | Jackson | 182/185 |
| 4,318,628 | 3/1982 | Mancini | 403/232.1 |
| 4,498,801 | 2/1985 | Gilb | 403/232.1 |
| 4,561,230 | 12/1985 | Rionda | 403/232.1 |
| 4,638,885 | 1/1987 | Frederick | 269/902 |

Primary Examiner—Reinaldo P. Machado
Attorney, Agent, or Firm—Roy E. Mattern, Jr.

[57] ABSTRACT

When a piece of an upright 2" by 4" lumber is used as a cross member of a sawhorse, staging, or scaffolding, a drop over hanger is removably lowered down over the upright piece of 2" by 4" lumber. Thereafter, on opposite sides of the 2" by 4" lumber, this drop over hanger positions its integral respective two sets of four originally upstanding spaced top entry projecting slotted tabs, one set being on each side of the 2" by 4" lumber. When a like second drop over hanger, oriented upside down and rotated ninety degrees to the first one, is manipulated to interfit with a set of four originally upstanding spaced top entry projecting slotted tabs, but now facing downwardly, to a like set of the first drop over hanger, then this second drop over hanger is positioned to support another piece of 2" by 4" lumber at right angles to the first piece of 2" by 4" lumber. Also other types of supports, such as Vee shaped multiple wider sized board supports, are equipped with an integral like set of four spaced depending then bottom entry projecting slotted tabs for interconnection with the four upstanding top entry slotted tabs of the first drop over hanger. Thereafter this combination positions the Vee shaped multiple wider sized board support to receive an end or near end portion of a wider board, the other end of which is supported by another combination of a like drop over hanger and a like Vee shaped multiple wider sized board support.

10 Claims, 2 Drawing Sheets

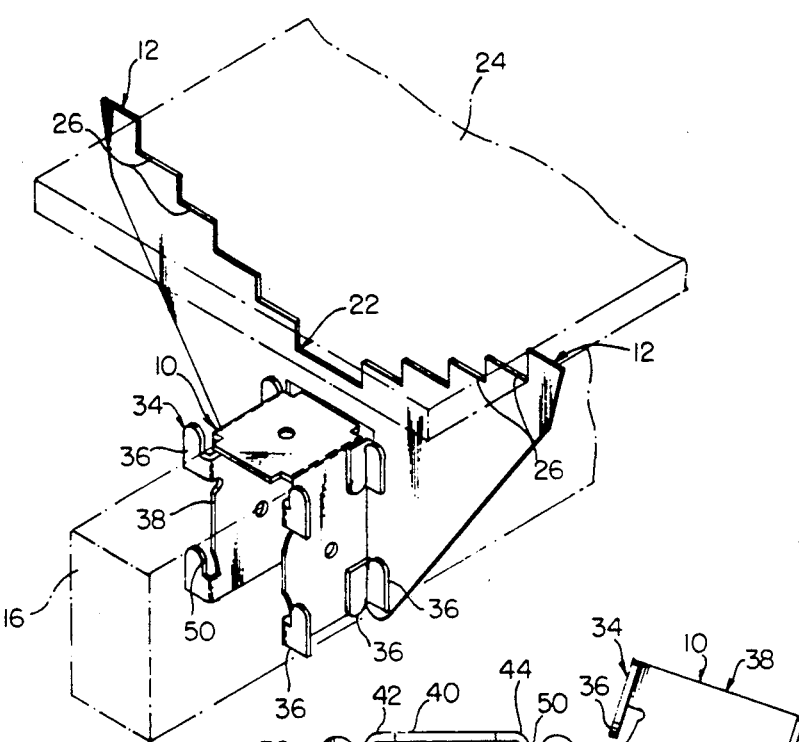
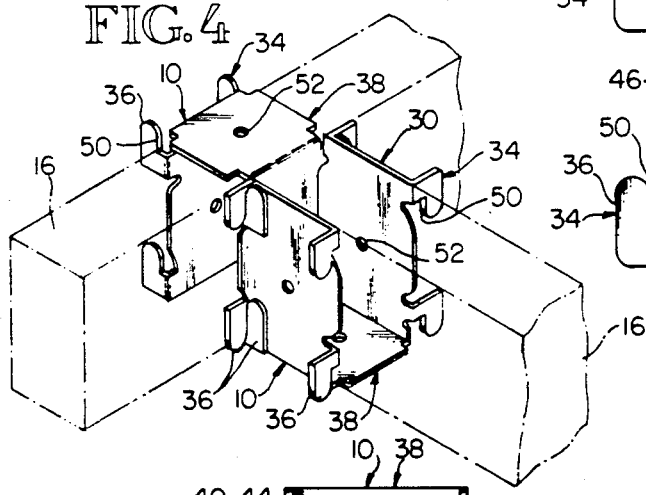
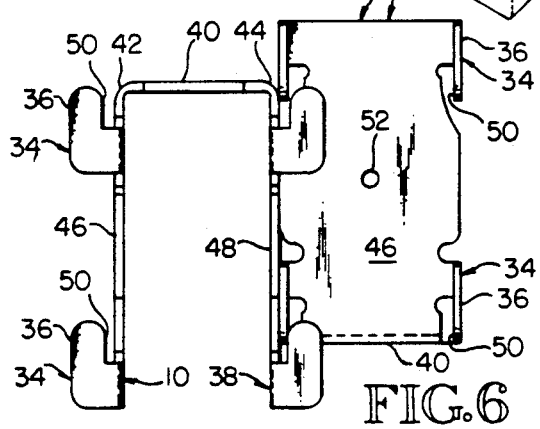
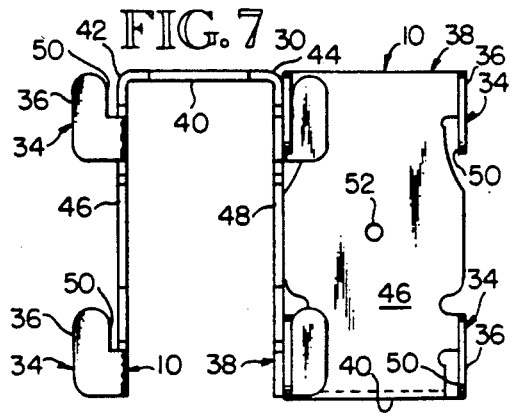

DROP OVER HANGER FOR PLACEMENT OVER AN UPRIGHT PIECE OF 2" BY 4" LUMBER TO SUPPORT ANOTHER LIKE HANGER OR ANOTHER TYPE OF SUPPORT, BY UTILIZING INTERFITTING SETS OF FOUR ORIGINALLY UPSTANDING SPACED TOP ENTRY PROJECTING SLOTTED TABS

BACKGROUND

Many fittings are available to be used with pieces of 2" by 4" lumber to create useful products, such as sawhorses, staging, scaffolds, and holders for other lumber sizes and logs. Examples of such fittings are disclosed in U.S. patents.

U.S. Pat. No. 4,298,096 illustrates and describes a convertible trestle leg assembly to support 2" by 4" lumber in either position to create a sawhorse.

U.S. D. Pat. No. 251,018 illustrates a sawhorse table conversion bracket, which drops over an upstanding 2" by 4" piece of lumber, and then supports an end of another piece of like lumber arranged perpendicularly to the first piece. By using four of these conversion brackets and several pieces of lumber covered with a piece of lumber or plywood, then a table, staging or scaffolding is made.

U.S. Pat. No. 4,121,814 discloses a sawbuck, using leg assemblies of the type shown in U.S. Pat. No. 4,298,096, to create a sawhorse. Then on the 2" by 4" piece of lumber of this sawhorse, two drop over and down supports are positioned, spaced apart, presenting their integral upright Vee shaped receivers to position a log for the subsequent cutting thereof.

These two spaced apart drop over and down supports, in another embodiment, are also provided with modified Vee supports having oppositely spaced cutouts, with pairs thereof, respectively supporting boards of specific widths.

These many fittings provide persons with many options to build items that help them accomplish other tasks. Yet there remains an opportunity to improve these fittings to lower their production costs, and also their shipping costs, while still retaining all their advantages.

SUMMARY

Some fittings already available to be used with pieces of 2" by 4" lumber are redesigned to reduce production costs by eliminating welding procedures and/or to reduce shipping and storage costs by nesting fittings to occupy less space. In reference to sawhorse table conversion type brackets, the previously perpendicular welded arrangement of two U shaped portions, one integral portion being used to drop down over a 2" by 4" piece of lumber, and the other integral portion being used to support the end of a 2" by 4" piece of lumber located perpendicular to the first piece of lumber, are now made in separate identical U shaped portions, each portion having four sets of originally upstanding spaced top entry projecting slotted tabs. These sets of projecting slotted tabs are used in part, to removably interconnect these U shaped portions in the same visual configuration, earlier portions of earlier products were previously arranged in, after they were welded together. These U shaped portions are referred to as the drop over hangers.

Also Vee supports for logs and Vee supports, with multiple paired cutouts serving as rest stops, to receive different sized wider boards are now formed with a set of these projecting slotted tabs to be interfitted with a set of projecting slotted tabs on a U Shaped portion called a drop over hanger. Thereafter the U shaped portion is lowered or dropped down over the upstanding 2" thick side of a piece of 2" by 4" lumber, to position the Vee support in an upright position to support a log or a wider board near one of its ends.

By making these components called drop over hangers, as separate parts to be selectively and optionally interconnected later, using, in part, their sets of four originally upstanding spaced top entry projecting slotted tabs, production costs are eliminated, which previously were attributed to welding costs. Also in marketing, packaging, and shipping procedures, nesting of these U shaped portions, called drop over hangers, and also nesting the Vee supports, often results in using smaller overall sized packages, in turn reducing packaging, handling, shipping, and storage costs.

DRAWINGS

The preferred embodiment of the drop over hanger for placement over an upright piece of 2" by 4" lumber to support another like hanger, or another type of support, utilizing interfitting sets of four originally upstanding spaced top entry projecting slotted tabs is illustrated in the drawings, wherein:

FIG. 1 is a perspective view of a sawhorse, supporting Vee shaped selective width wider board supports, which are made to include, below, depending spaced entry projecting slotted tabs to be interfitted with upstanding spaced top entry projecting slotted tabs of the drop over hanger to complete this assembled Vee shaped support;

FIG. 2 is a perspective view of two sawhorses, each having an upstanding piece of 2" by 4" lumber, and together supporting four sets of the drop over hangers, with each drop over hanger having the four originally upstanding spaced top entry projecting slotted tabs, and each set being made by rearranging and interconnecting two drop over hangers; then, thereafter, by utilizing two more pieces of 2" by 4" lumber, extended at right angles, and supported by the respective sets of the drop over hangers, a planar support is made to receive boards and/or plywood, to be worked on, or to serve as a platform, scaffold, staging, and/or table;

FIG. 3 is a partial perspective view illustrating how the Vee shaped selective width wider board supports, as shown in FIG. 1, are made to include, below, spaced depending entry projecting slotted tabs, which are interfitted with spaced upstanding top entry projecting slotted tabs of the drop over hanger, removably placed over the piece of 2" by 4" lumber, serving as the horizontal component of the sawhorse;

FIG. 4 is a partial perspective view illustrating how two drop over hangers, both having sets of four originally upstanding spaced top entry projecting slotted tabs are interfitted, after one is turned upside down and then rotated through ninety degrees and then preferably tilted during assembly; and then after their interfitting, one of them is supported on the upstanding piece of 2" by 4" lumber to position the other one of them to support a piece of 2" by 4" lumber, which is then arranged perpendicular to the first piece of 2" by 4" lumber, to start an assembly of a planar support, as shown in FIG. 2;

FIG. 5 is an elevational view of two drop over hangers, being interfitted to be positioned as shown in FIG. 4, after one of them has been turned upside down, then rotated through ninety degrees and tilted to commence their interfitting;

FIG. 6 is an elevational view of the two drop over hangers, shown being interfitted in FIG. 5, after the tilting entries have been undertaken with respect to the originally upstanding spaced top entry projecting slotted tabs of the drop over hanger to be dropped over the piece of 2" by 4" lumber, and with respect to the then depending spaced bottom entry projecting slotted tabs of the drop over hanger being positioned to support a piece of 2" by 4" lumber in a position perpendicular to the first piece of 2" by 4" lumber; and FIG. 7 is an elevational view of the two drop over hangers, shown being interfitted in FIGS. 5 and 6, as their interfitting is completed, after they have been moved vertically relative to one another to complete the interlocking of the originally upstanding spaced top entry projecting slotted tabs to the identically shaped projecting slotted tabs, then being in a position to be referred to as the depending spaced bottom entry projecting slotted tabs.

DESCRIPTION OF THE PREFERRED EMBODIMENTS

Figure 1:
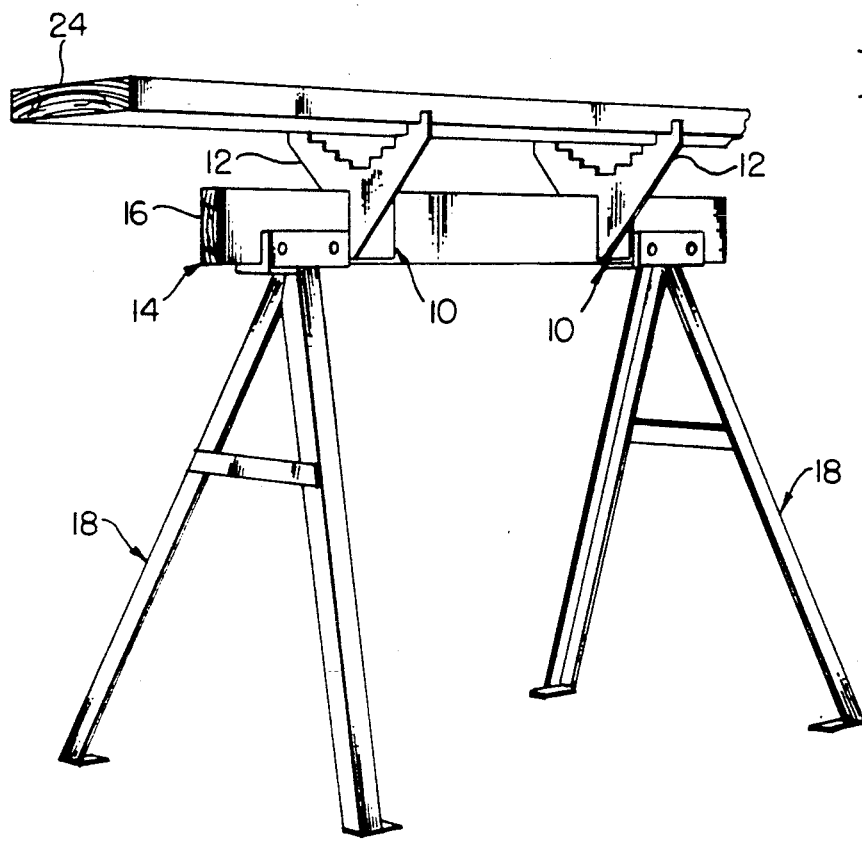
Figure 2:
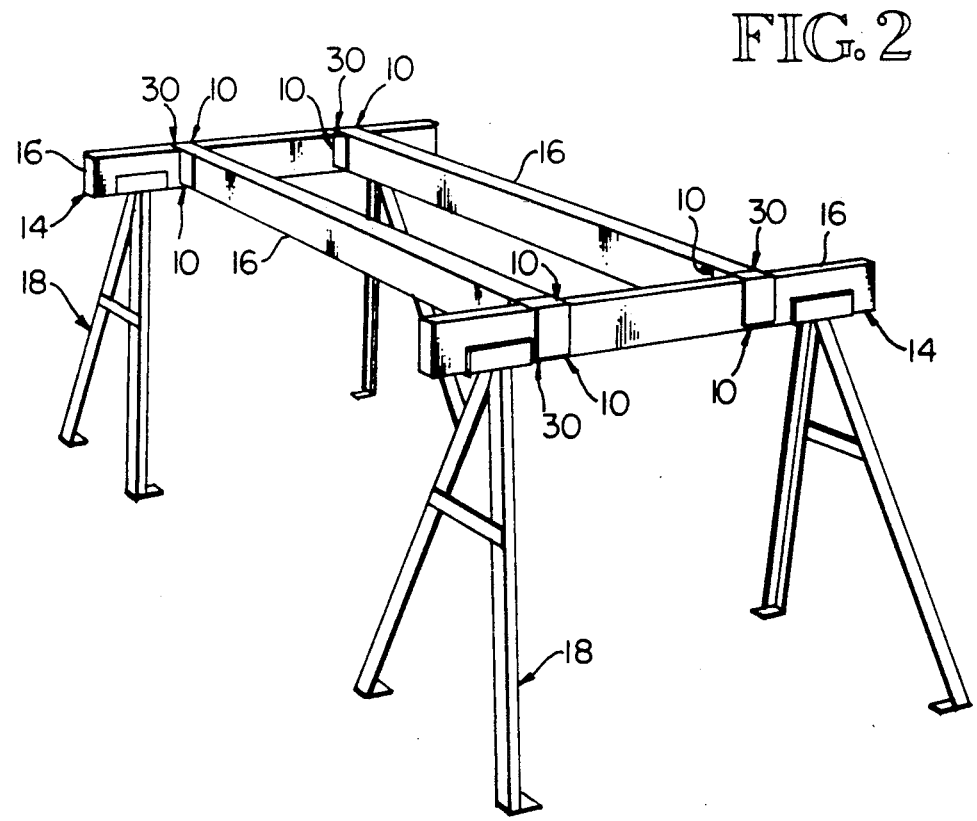

The drop over hanger 10, when used with other like hangers 10, or when used with a Vee shaped support 12, serves to assist a work person with his or her projects in the ways, such as illustrated in FIGS. 1 and 2. Like and similar ways have previously been undertaken by utilizing somewhat similar hangers and supports. In the past, these similar hangers and supports have been manufactured by using cutting and bending procedures followed by using welding procedures. Now, as particularly indicated in FIGS. 3 through 7, these hangers and supports are manufactured by using cutting and bending procedures only, because using welding procedures is no longer necessary.

In reference to FIG. 1, when a sawhorse 14, utilizing a piece of 2" by 4" lumber 16, supported on metal leg subassembly 18, was employed, in turn, to position and to support two Vee shaped supports 12, previously each one of the Vee shaped supports 12 had a drop over type hanger previously welded on the rectangular receiving portion 20, thereof. Thereafter, Vee shaped portion 22 of each Vee shaped support 12 held a respective portion of a log or of a wide wood board 24. To hold wide wood boards 24 of different widths, several various spaced paired opposite stop rests 26 were formed in the Vee shaped portion 22 of the Vee shaped support 12.

In reference to FIG. 2, when two sawhorses 14, each utilizing a piece of 2" by 4" lumber 16, supported on metal leg subassemblies 18, were spaced apart to receive longer pieces of 2" by 4" lumber 16 to create a planar support 28, to in turn receive boards and/or plywood, not shown, to create a table, staging, or scaffolding, two drop over type hangers previously were welded together, after one was turned upside down and then rotated ninety degrees. Then when the one drop over type hanger was dropped over the upstanding piece of 2" by 4" lumber 16, it positioned the other welded drop over type hanger to receive a piece of 2" by 4" lumber 16 at right angles to the piece of 2" by 4" lumber of the sawhorse 14, with the tops of the 2" by 4" lumber being positioned at the same level. Four sets of these welded together drop over type hangers were used in creating the planar support, as indicated in FIG. 2, in respect to the illustration of the now assembled sets 30.

When these welded Vee shaped support sets 32, and welded drop over hanger support sets 30 were not being used, and then were being stored, packaged, and/or shipped, they occupied a comparatively good size volume. Also the welding procedures utilized were comparatively expensive, in comparison with non welded like purpose sets illustrated in FIGS. 3 and 4, which are also easily stored, packaged, or shipped.

Welding is no longer necessary and space saving nesting is realized, as illustrated in FIGS. 3, 4, 5, 6, and 7. Each drop over hanger 10 has at least one set 34 of four originally upstanding spaced top entry projecting slotted tabs 36. Preferably, each hanger 10 has two sets 34, which make each drop over hanger 10 the same for manufacturing purposes and which make each drop over hanger 10 universally available to be interconnected quickly and conveniently, as illustrated in these FIGS. 3 through 7.

Each drop over hanger 10 is manufactured by using stamping, cutting, and or bending procedures, but not welding procedures. Each drop over hanger 10 is formed as an integral U shaped body 38 having an integral transverse planar spacing and interconnecting rectangular portion 40, sized so its two longitudinal edges 42, 44 will extend over and slightly beyond the regular width of the top of an upstanding 2" by 4" piece of lumber 16.

This U shaped body 38 also has two spaced extending planar rectangular portions 46, 48, each one of which extends integrally at a right angle from a respective longitudinal edge 42 or 44 of the integral transverse planar spacing and interconnecting rectangular portion 40. Each extending portion 46 or 48, is sized to substantially extend adjacent to the regular depth side of an upstanding piece of 2" by 4" lumber.

This U shaped body 38 also has two sets 34 of four originally upstanding top entry projecting slotted tabs 36, each set 34 being integrally formed with one of the two spaced extending planar rectangular portions 46, 48. In respect to the arrangement of the sets 34, as a drop over hanger 10 is viewed, when it has been moved down over a piece of 2" by 4" lumber, there are two spaced upstanding spaced top entry projecting slotted tabs 36, integrally projecting outwardly and upwardly, at ninety degrees, from the top of each extending portion 46, 48, and there are two spaced upstanding spaced top entry projecting slotted tabs 36 integrally projecting outwardly and upwardly, at ninety degrees, from the bottom of each extending portion 46, 48.

The contour of the slots 50 is formed by both the respective tabs 36 and the respective portions 46, 48. These slots 50 are slightly wider than the thickness of the metal, from which all portions of the drop over hanger 10 are made, including these integral tabs 36 in their sets 34 of four. These tabs 36 are formed and positioned to receive the like sized tabs 36 of the Vee shaped support 12, and of another like drop over hanger 10, which has been inverted and turned ninety degrees, as respectively shown in FIGS. 3 and 4.

The assembly of a drop over hanger 10 to Vee shaped support 12, or to another drop over hanger 10, is preferably undertaken by first tilting one part relative to the other part. This tilting assembly of two drop over hangers 10 is illustrated in FIGS. 5, 6, and 7, and the tilting is helpful in making the initial alignment. In FIG. 5, the tilting is shown to be commencing. In FIG. 6, the tilting is shown to be completed, and the lowering of the drop over hanger 10 relative to the first drop over hanger 10 is shown to be commencing. In FIG. 7, the interfitting of the respective spaced projecting slotted tabs 36 is shown after the completion of their assembly.

Although these drop over hangers 10 are preferably installed to be removable, at some locations their position along a piece of 2" by 4" lumber must be retained. If so, nails, screws, or other types of fasteners, not shown, are used to secure them in place, in turn utilizing one of their selectable fastener receiving holes 52.

I claim:

1. A drop over hanger for placement over an upright piece of 2" by 4" lumber to support another reoriented like hanger, or another type of support, by utilizing integral interfitting sets of four originally upstanding spaced top entry projecting slotted tabs, comprising an integral U shaped body, having:
    a) an integral transverse planar spacing and interconnecting rectangular portion having two longitudinal edges sized to extend over and slightly beyond the top of a portion of an upstanding piece of 2" by 4" lumber;
    b) two spaced extending planar rectangular portions, each one integrally extending at a right angle from a respective longitudinal edge of the integral transverse planar spacing and interconnecting rectangular portion, and each one sized to extend adjacently substantially along the 4" depth side of an upstanding piece of 2" by 4" lumber; and
    c) two sets of four originally upstanding spaced top entry projecting slotted tabs, each set being integrally formed with one of the two spaced extending planar rectangular portions, when they, with the integral transverse planar spacing and interconnecting rectangular portion, comprise the integral U shaped body, which serves as a drop over hanger.

2. A drop over hanger, as claimed in claim 1, wherein each originally upstanding spaced top entry projecting slotted tab is integrally arranged at a right angle to a respective spaced extending planar rectangular portion, and extends outwardly therefrom.

3. A drop over hanger, as claimed in claim 2, wherein each originally upstanding spaced top entry projecting slotted tab has a slot width slightly wider than the thickness of the slotted tab, thereby permitting the convenient interfitting of another then depending spaced bottom entry projecting slotted tab of either another drop over hanger, which has been inverted, or another type of support, having depending spaced bottom entry projecting slotted tabs of like shape.

4. A drop over hanger, as claimed in claim 3, wherein in each set of four originally upstanding spaced top entry projecting slotted tabs, these tabs are arranged in pairs, with one pair of tabs being located on an extending planar rectangular portion, where the transverse planar spacing and interconnecting rectangular portion is located, and with the other pair of tabs being located at the other end of the extending planar rectangular portion, which is not interconnected.

5. A drop over hanger, as claimed in claim 4, wherein the originally upstanding spaced top entry projecting slotted tabs of each pair are spaced apart, so each tab is adjacent an edge of a spaced extending planar rectangular portion.

6. A drop over hanger, as claimed in claim 1, wherein both sets of the four originally upstanding spaced top entry projecting slotted tabs have two tabs of each set interconnected to like shaped tabs which are presented inverted and turned ninety degrees, and which are integrally formed in a Vee shaped support for holding a log or a piece of lumber in place.

7. A drop over hanger, as claimed in claim 1, wherein one set of the four originally upstanding spaced top entry projecting slotted tabs is interconnected to four like tabs, two tabs of which are respectively in one set of four like tabs, and two tabs are respectively in another set of four like tabs, with these respective sets of four tabs being on another like drop over hanger, which is inverted and turned ninety degrees, thereby forming an overall drop over hanger to position pieces of 2" by 4" lumber at right angles to one another.

8. A drop over hanger for placement over an upright piece of 2" by 4" lumber to support another reoriented like hanger, or another type of support, by utilizing integral interfitting sets of four originally upstanding spaced top entry projecting slotted tabs, comprising an integral U shaped body having:
    a) an integral transverse planar spacing and interconnecting rectangular portion having two longitudinal edges sized to extend over and slightly beyond the top of a portion of an upstanding piece of 2" by 4" lumber;
    b) two spaced extending planar rectangular portions, each one integrally extending at a right angle from a respective longitudinal edge of the integral transverse planar spacing and interconnecting rectangular portion, and each one sized to extend adjacently substantially along the 4" depth side of an upstanding piece of 2" by 4" lumber; and
    c) a set of four originally upstanding spaced top entry projecting slotted tabs, being integrally formed with one of the two spaced extending planar rectangular portions, when they, with the integral transverse planar spacing and interconnecting rectangular portion, comprise the integral U shaped body, which, when inverted, serves as a drop over hanger.

9. A drop over hanger type Vee shaped support for holding a log or a piece of lumber in place, in respect to a portion thereof, comprising an integral essentially planar body having:
    a) a Vee shaped receiving portion above to position a piece of lumber;
    b) a rectangular shaped receiving portion below to fit, with clearance, over an upstanding piece of 2" by 4" lumber; and
    c) a set of four depending spaced bottom entry projecting slotted tabs integrally formed on the rectangular shaped receiving portion below, and arranged to interfit with respective originally upstanding spaced top entry projecting slotted tabs integrally formed on a drop over hanger.

10. A drop over hanger type Vee shaped support, as claimed in claim 9, wherein the Vee shaped receiving portion has paired oppositely positioned rest stops of respective different transverse spacings to position wider boards of varying respective widths.

* * * * *